United States Patent

Leistner

[11] Patent Number: 5,618,144
[45] Date of Patent: Apr. 8, 1997

[54] TEE-NUT WITH ENLARGED BARREL END

[75] Inventor: Volkmar W. Leistner, Toronto, Canada

[73] Assignee: Sigma Tool & Machine, Scarborough, Canada

[21] Appl. No.: 526,324

[22] Filed: Sep. 11, 1995

[51] Int. Cl.⁶ .......................... F16B 39/28; F16B 37/00
[52] U.S. Cl. .......................... 411/427; 411/176; 411/183; 411/184
[58] Field of Search .......................... 411/427, 176, 411/177, 179, 180, 171, 183, 184

[56]  References Cited

U.S. PATENT DOCUMENTS

| | | | |
|---|---|---|---|
| 1,309,616 | 7/1919 | Eisler | 411/427 |
| 1,693,957 | 12/1928 | Oakley | 411/427 |
| 2,217,026 | 10/1940 | Nickerson | 411/176 |
| 2,222,747 | 11/1940 | Klein | 411/176 |
| 2,282,851 | 5/1942 | Burke | 411/176 |
| 2,460,721 | 2/1946 | Thompson | 411/427 |
| 3,403,718 | 10/1968 | Hughes | 411/180 |
| 5,238,344 | 8/1993 | Nagayama | 411/183 |
| 5,267,832 | 12/1993 | Johnson | 411/183 |
| 5,348,432 | 9/1994 | Nagayama . | |

*Primary Examiner*—Flemming Saether

[57]  ABSTRACT

A tee-nut comprises a flange head, a plurality of prongs extending from the flange head, and a hollow barrel extending from the flange head. The hollow barrel has an internally threaded portion provided at one end of the barrel connecting to the flange head, and an enlarged flarable portion extending from the internally threaded portion and provided at a free end of the barrel. The present invention further discloses a method of forming a tee-nut with an enlarged barrel end, by first swaging out and expanding the free end of the barrel and thereafter threading the unexpanded portion of the barrel.

4 Claims, 3 Drawing Sheets

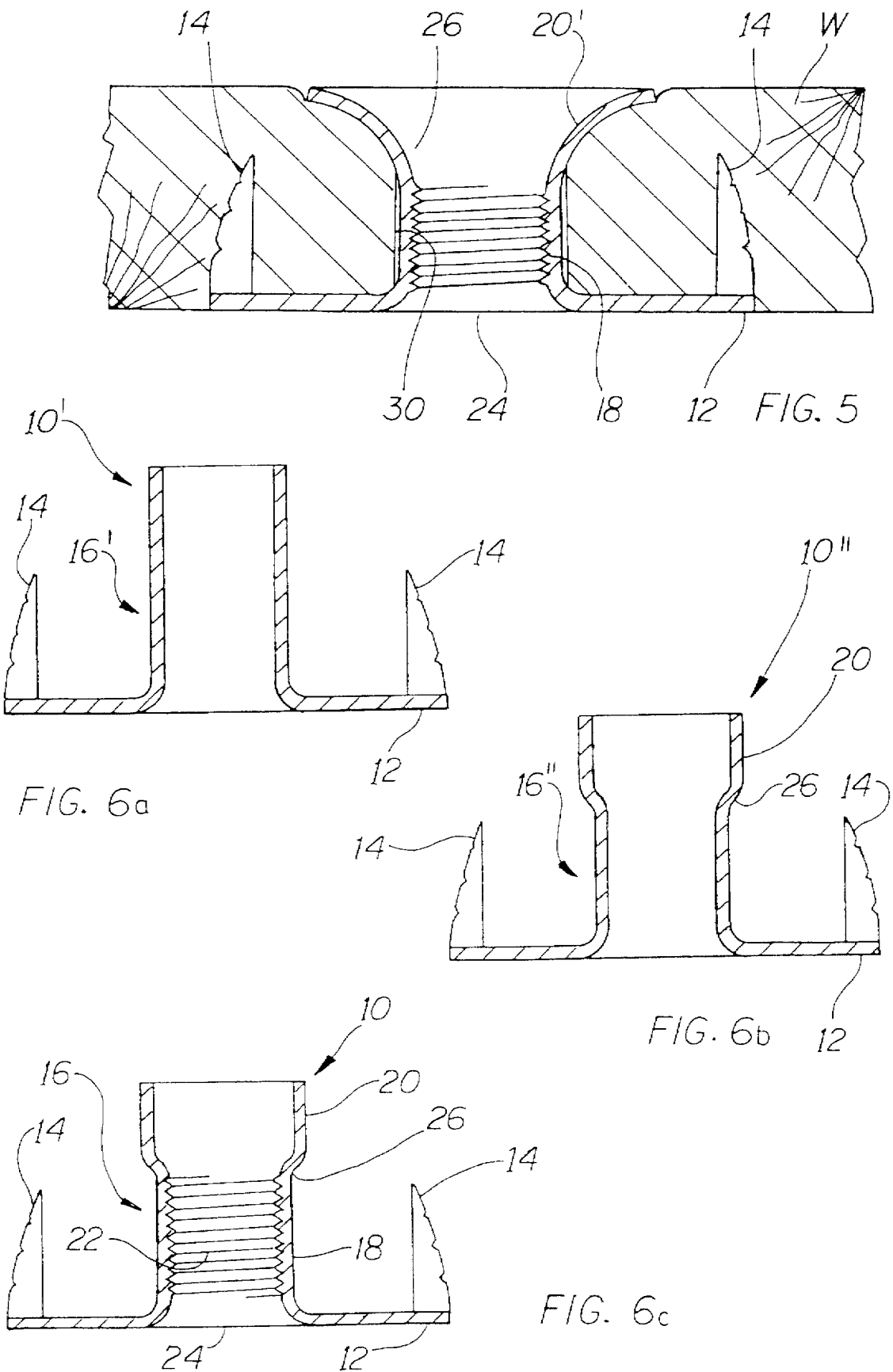

TEE-NUT WITH ENLARGED BARREL END

FIELD OF THE INVENTION

The present invention relates to a tee-nut and, in particular, to a tee-nut having an enlarged flarable barrel end. The present invention also relates to a method of forming a tee-nut with an enlarged barrel end.

BACKGROUND OF THE INVENTION

Fastener members, having a flange portion and a hollow barrel portion with a flarable end, are known and are commonly referred as tee-nuts, or rivet type tee-nuts. In In this specification, the term "tee-nut" is used to describe such fastener members.

Such tee-nuts are usually formed of sheet metal, and provide a flanged portion, a threaded sleeve or barrel portion, and a plurality of fastening teeth or prongs, all formed out of a single piece of sheet metal.

Typically such tee-nuts are used, for example, in furniture frame, for fastening the arms and legs of the furniture to the frame. They do have a variety of other uses, both in furniture and in many other industries.

U.S. Pat. No. 5,348,432 granted to Nagayama on Sep. 20, 1994 discloses a tee-nut having a sleeve in the form of a hollow cylinder with a relatively thin-walled flarable end portion and a relatively thicker-walled threaded portion. The thin-walled flarable hollow sleeve end is formed by counter boring an entirely internally threaded hollow sleeve. The disadvantage of this product is that counter boring is uneconomical to perform. Also, tiny metal scraps are likely to be left behind within the internal threads. Also, when flared outwardly, the flarable counter-bored end has a tendency to split.

BRIEF SUMMARY OF THE INVENTION

The present invention provides a tee-nut to overcome the disadvantages of the prior art.

The present invention provides a tee-nut comprising a flange head member, a plurality of prongs extending from said flange head member, and a sleeve member extending from said flange head member, said sleeve member being in the form of a hollow barrel comprising an internally threaded portion provided at one end of said sleeve member connecting to said flange head member, and an enlarged flarable portion extending from said internally threaded portion and provided at a free end of said sleeve member, wherein the outer diameter of said enlarged flarable portion is larger than the outer diameter of said internally threaded portion, and wherein the inner diameter of said enlarged flarable portion is larger than the inner diameter of said internally threaded portion such that a threading tool is adapted to pass through said enlarged flarable portion and internally threading said one end of said sleeve member forming said internally threaded portion.

The present invention further provides a tee-nut having an outwardly extending portion connecting between said internally threaded portion and said enlarged flarable portion, said outwardly extending portion being adapted to be flared outwardly when said enlarged flarable portion is being flared out.

The present invention provides, in accordance with a first embodiment, a tee-nut wherein said enlarged flarable portion is generally cylindrical in shape.

The present invention provides, in accordance with a second embodiment, a tee-nut wherein said enlarged flarable portion is in the shape of a truncated cone tapering towards said internally threaded portion.

The present invention further provides a tee-nut wherein said enlarged flarable portion is adapted to be flared out forming a trumpet-shaped flared end for holding said tee-nut in a through hole of a workpiece and preventing said tee-nut from being disengaged from said through hole.

The present invention further provides a tee-nut wherein the wall thickness of said enlarged flarable portion is less than the wall thickness of said internally threaded portion.

The present invention also provides a method of forming a tee-nut with an enlarged barrel end, said tee-nut having a flange head, a plurality of prongs extending from said flange head, and a hollow barrel extending perpendicular to said flange head and having one end connected to said flange head and a free end, the method comprising the steps of enlarging said free end of said barrel by means of a swaging tool, and thereafter forming threads on the inner surface of said one end of said barrel connecting to said flange head by means of a threading tool.

The present invention provides a method of forming a tee-nut with an enlarged barrel end, further comprising the step of forming an outwardly extending portion connecting between said expanded free end and said unexpanded end of said barrel simultaneously when expanding said free end of said barrel.

The present invention provides a method of forming a tee-nut with an enlarged barrel end, further comprising the step of reducing the wall thickness of said free end of said barrel while simultaneously expanding said free end.

The various features of novelty which characterize the invention are pointed out with more particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

IN THE DRAWINGS

FIG. 5 is a sectional view showing a tee-nut being inserted into a pre-drilled through hole of a workpiece, and with its barrel end being flared out;

FIG. 6a is a sectional view of a tee-nut member with a hollow cylindrical barrel;

FIG. 6b is a sectional view showing an enlarged flarable portion being formed at one end of the barrel of the tee-nut in FIG. 6a; and FIG. 6c is a sectional view showing an internal threaded portion being formed at the other end of the barrel of the tee-nut in FIG. 6b.

DESCRIPTION OF A SPECIFIC EMBODIMENT

Figure 1:
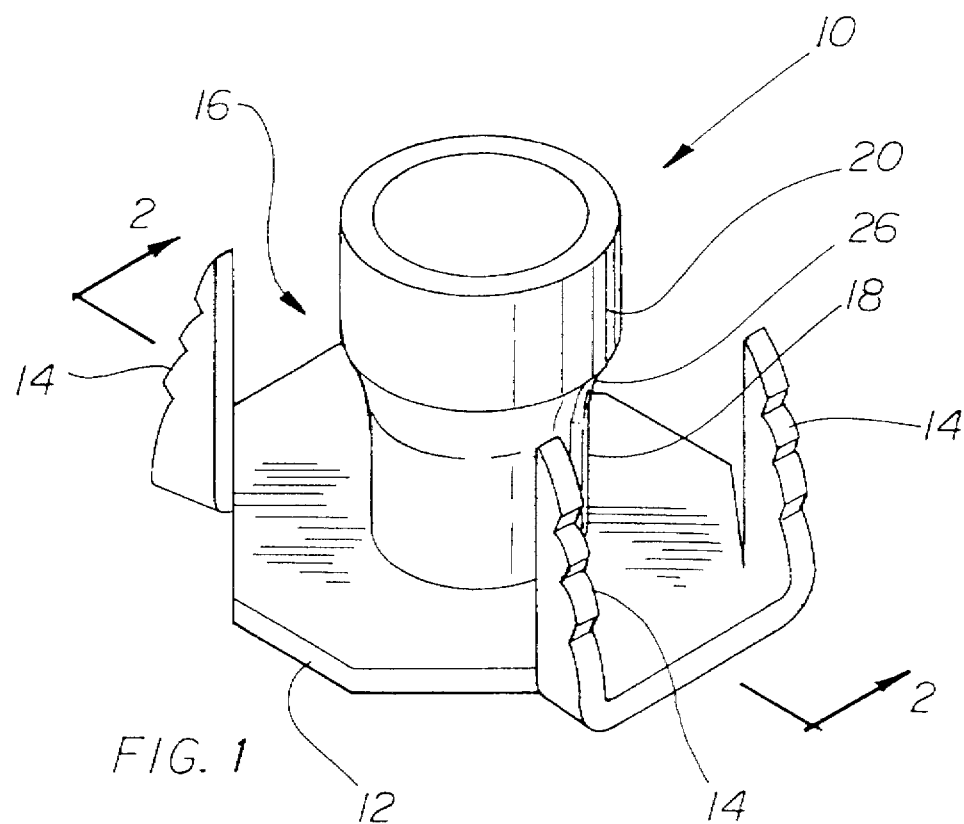
FIG. 1 is a perspective view of a tee-nut according to a first embodiment of the present invention.
Figure 2:
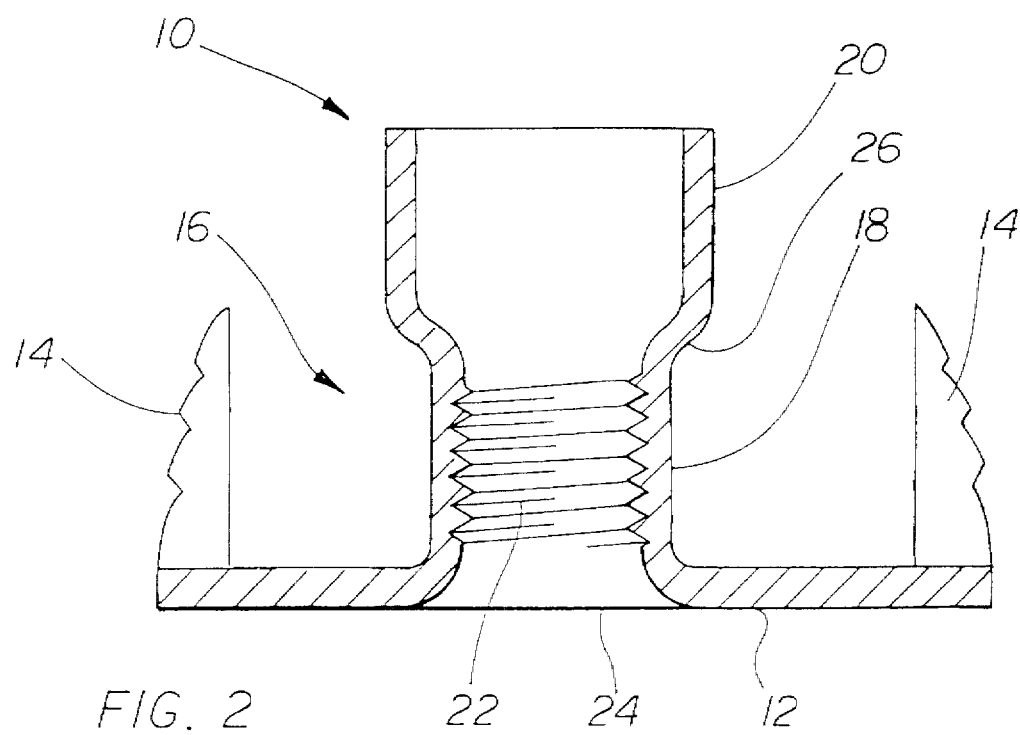
FIG. 2 is a sectional view taken along line 2—2 in FIG. 1.

FIGS. 1 and 2 show a tee-nut according to a first embodiment of the present invention.

The tee-nut, generally indicated by reference numeral 10, comprises an octagon-shaped flange head 12, four integral prongs 14—14 extending from the flange head 12, and an integral hollow sleeved or barrel 16 extending perpendicular from the flange head 12.

The barrel 16 comprises an internal threaded portion 18 and an enlarged portion 20.

The internal threaded portion 18, having internal threads 22, defines an internal aperture or opening 24 in which a co-operating threaded screw member (not shown) is received.

The enlarged portion 20 is formed by expanding or swaging the free end of the barrel 16 by means of a conventional swaging tool. According to the present embodiment, the enlarged portion 20 is in the form of a hollow cylinder extending from the internal threaded portion 18.

The outer diameter of the enlarged flarable portion 20 is larger than the outer diameter of said internally threaded portion 18. The inner diameter of the enlarged flarable portion 20 is larger than the inner diameter of the internally threaded portion 18 such that a threading tool is adapted to pass through the enlarged flarable portion 20 and internally threading the barrel 16 forming the internally threaded portion 18.

An outwardly extending portion 26 is formed between the internal threaded portion 18 and the enlarged portion 20. The outwardly extending portion 26 is formed simultaneously when the enlarged portion 20 is formed.

FIG. 5 shows a tee-nut 10 being inserted into a pre-drilled through hole 30 of a workpiece W, such as a piece of wood, or a panel of clipboard, or other composite material. The diameter of the through hole 30 is slightly larger than the outer diameter of the threaded barrel portion 18 of the tee-nut 10. The prongs 14—14 penetrate the workpiece W and prevent rotation of the tee-nut 10 when a threaded screw member is being threadingly engaged to the internal threaded portion 18.

The enlarged portion 20 extends through the hole 30 and is then flared out by means of a conventional flaring tooling forming a trumpet-shaped flared end 20'. The flared end 20' is adapted to securely hold the tee-nut 10 within the pre-drilled through hole 30 of the workpiece 10 and prevent the tee-nut 10 from being withdrawn or pulled out from the workpiece W. The flared end 20' also serve to centre the threaded barrel portion 18 in the through hole 30.

FIGS. 6a, 6b and 6c show the steps of forming the tee-nut 10 according to the first embodiment of the present invention.

FIG. 6a is a cross sectional view of a tee-nut member 10' having a flange head 12, prongs 14, 14, and a barrel 16'. The barrel 16' is in the form of a hollow cylindrical sleeve initially with a uniform wall thickness.

The free end of the barrel 16' is enlarged by means of a conventional swaging tool forming an enlarged portion 20 on the barrel 16" of the tee-nut member 10", as illustrated in FIG. 6b. When the free end of the barrel 16' is being enlarged, the wall thickness of the free end of the barrel 16' is reduced. This reduction of the wall thickness of the free end of the barrel 16' facilitates the flaring of the enlarged portion 20 to be performed later on.

An outwardly extending portion 26 is simultaneously formed when the enlarged end 20 is being formed at the free end of the barrel 16".

Finally, threads 22 are formed on the internal surface of the unswaged portion of the barrel 16" by means of a conventional threading tool. Since the free end 20 of the barrel 16 has already been enlarged, the threading tool can be inserted through the enlarged portion 20 and form the internal threaded portion 18.

The threads 22 remain clear of chips of metals since the enlarged portion 20 is formed by swaging before the threading tool is inserted.

Figure 3:
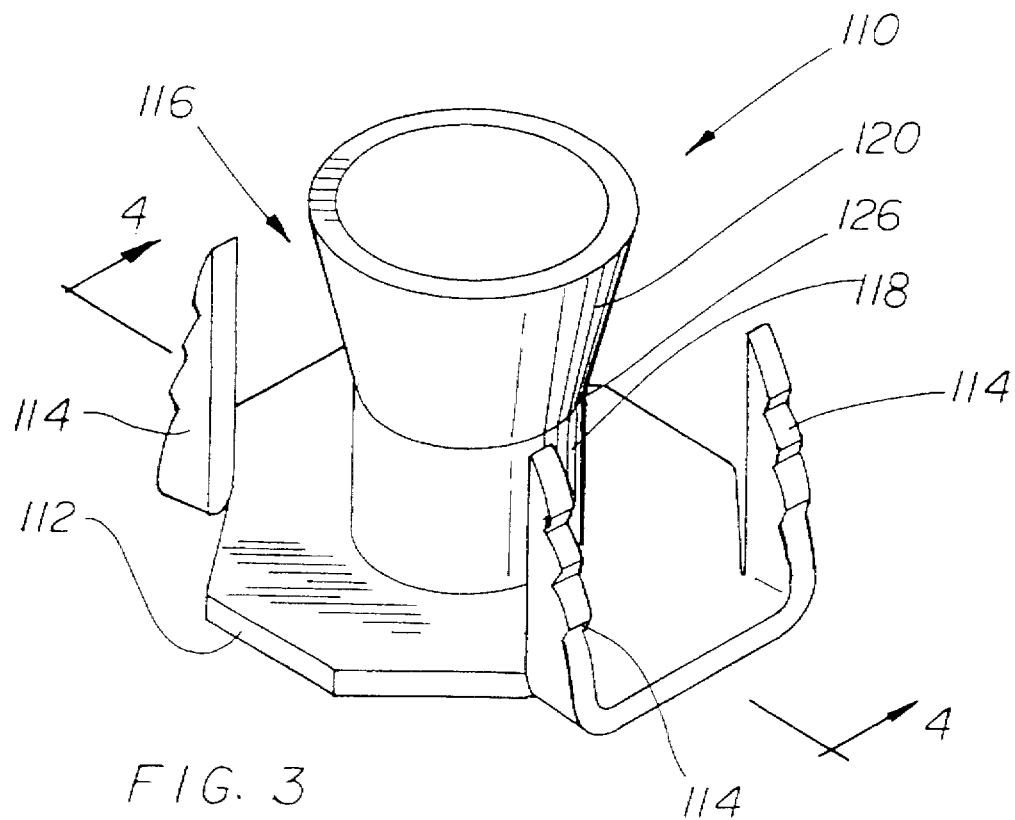
FIG. 3 is a perspective view of a tee-nut according to a second embodiment of the present invention.
Figure 4:
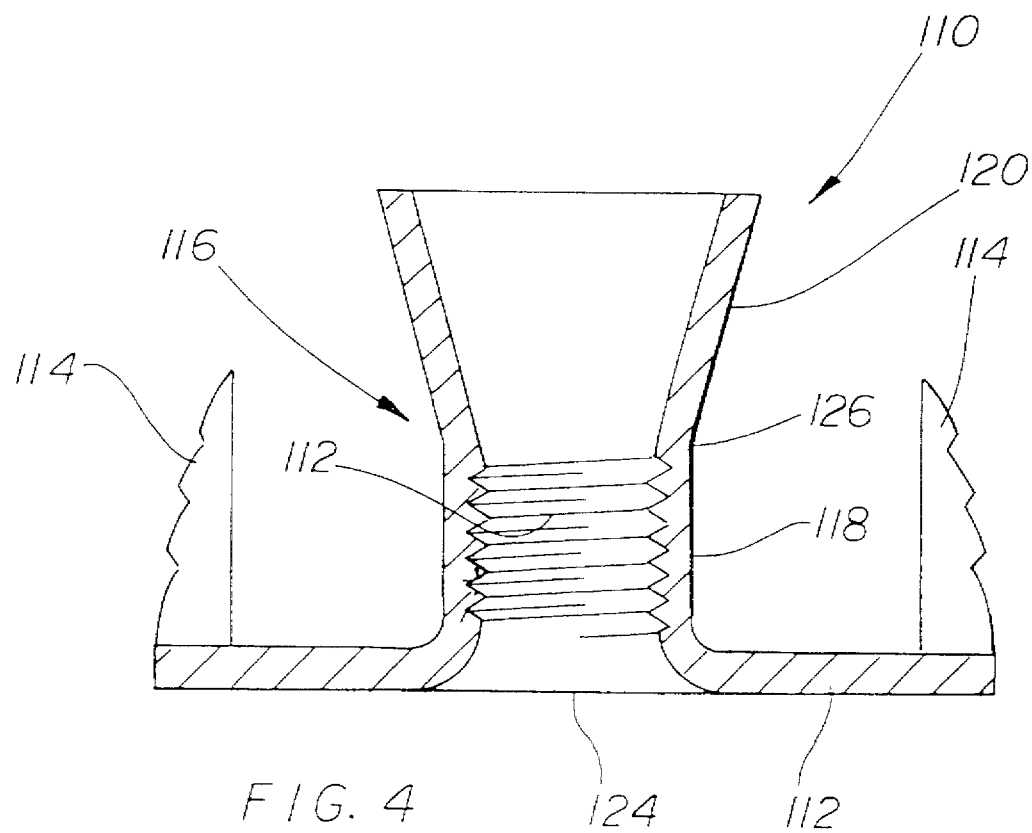
FIG. 4 is a sectional view taken along line 4—4 in FIG. 3.

FIGS. 3 and 4 show a tee-nut according to a second embodiment of the present invention.

The tee-nut, generally indicated by reference numeral 110, comprises an octagon-shaped flange head 112, four integral prongs 114—114 extending from the flange head 112, and an integral hollow sleeve, or barrel 116 extending perpendicular from the flange head 112.

The barrel 116 comprises an internal threaded portion 118 and an enlarged portion 120.

The internal threaded portion 118, having internal threads 122, defines an internal aperture or opening 124 in which a co-operating threaded screw member (not shown) is received.

The enlarged portion 120 is formed by expanding or swaging the free end of the barrel 116 by means of a conventional swaging tool. According to the present embodiment, the enlarged portion 120 is in the form of a hollow truncated cone member extending from the internal threaded portion 118. The enlarged portion 120 tapers towards the internal threaded portion 118.

Again, when the free end of the barrel 116 is being expanded, its wall thickness is reduced. This reduction of wall thickness of the free end of the barrel 116 facilitates the flaring of the free end to be performed later on.

An outwardly extending portion 126 is formed between the internal threaded portion 118 and the enlarged portion 120. The outwardly extending portion 126 is formed simultaneously when the enlarged portion 120 is formed.

Similarly, the tee-nut 110 is adapted to be inserted into a pre-drilled through hole 30 of a workpiece W. The prongs 114—114 penetrate the workpiece W and prevent rotation of the tee-nut 110 when a threaded screw member is being threadingly engaged to the internal threaded portion 118.

The enlarged portion 120 extends through the hole 30 and is then flared out by means of a conventional flaring tooling. The enlarged flared end is adapted to securely hold the tee-nut 110 within the pre-drilled through hole 30 of the workpiece 10 and prevent the tee-nut 110 from being withdrawn or pulled out from the workpiece W.

The enlarged flarable portions 20 and 120 of reduced wall thickness and the outwardly extending portions 26 and 126 facilitate a smooth flaring of the flarable ends of the tee-nuts 10 and 110. The enlarged flarable portions 20 and 120 are able to flare into stronger and better trumpet-shaped flared ends thereby forming better flare holding for the tee-nuts 10 and 110 within the through hole 30 of a workpiece W.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. A tee-nut comprising:

a flange head member;

a plurality of prongs extending from said flange head member; and a sleeve member extending from said flange head member;

said sleeve member, being in the form of a hollow cylindrical barrel, comprising:

an internally threaded cylindrical portion provided at one end of said sleeve member, said threaded portion connecting to said flange head member and defining predetermined first inner and first outer diameters; and an enlarged cylindrical portion extending from said internally threaded cylindrical portion and provided at a free end of said sleeve member and defining predetermined second inner and second outer diameters, wherein said second outer diameter of said enlarged cylindrical portion is larger than said first outer diameter of said internally threaded portion, and wherein said second inner diameter of said enlarged cylindrical portion is larger than said first inner diameter of said internally threaded portion such that a threading tool can be passed through said enlarged cylindrical portion, and can be operated to internally thread said internally threaded portion.

2. A tee-nut as claimed in claim 1 further comprising an outwardly extending portion connecting between said internally threaded portion and said enlarged cylindrical portion, and tapering towards said internally threaded portion, said outwardly extending portion being bent outwardly to meet said enlarged flarable portion.

3. A tee-nut as claimed in claim 1 wherein said enlarged cylindrical portion is adapted to be flared out forming a trumpet-shaped flared end for holding said tee-nut in a through hole of a workpiece and preventing said tee-nut from being disengaged from said through hole.

4. A tee-nut as claimed in claim 1 wherein the wall thickness of said enlarged cylindrical portion is less than the wall thickness of said internally threaded portion.

* * * * *